UNITED STATES PATENT OFFICE 2,171,423

METHOD OF REACTING A TETRA-ALKYL LEAD AND A NITRO-PHENOL

Mario S. Altamura, Woodbury, N. J., assignor to Socony-Vacuum Oil Company, Incorporated, New York, N. Y., a corporation of New York No Drawing. Application April 8, 1938,
Serial No. 201,021

8 Claims. (Cl. 260—435)

This invention relates to the production of alkyl lead salts of nitrophenols. More particularly, the invention relates to a method for the preparation of inflammable compounds by the direct reaction between tetra-alkyl lead and nitrophenols.

It is known that compounds of the nature of alkyl lead derivatives of nitrophenols, wherein lead is in the tetravalent state, are of an inflammable nature and, furthermore, are especially suited for use as ignition compositions as, for example, in blasting caps. Accordingly, in view of the commercial value of these compounds, it is highly desirable that their preparation be as simple and economical as possible.

Heretofore, the alkyl lead derivatives of nitrophenols, wherein lead is in the tetravalent state, have only been prepared indirectly as, for instance, by first preparing a salt of the alkyl lead compound and then reacting this salt in a suitable medium with an alkali metal salt of the nitrophenol. As is apparent, at least three distinct steps, not to mention the use of other materials, are required for such operations. Thus: (1) the alkyl lead compound must first be reacted with an acid, such as acetic acid, to form the alkyl lead salt; (2) the nitrophenol must be reacted to form an alkali metal salt thereof; and (3) the alkyl lead salt and the alkali metal salt of the nitrophenol must then be reacted in a suitable medium to form the desired compound by a double decomposition reaction. Obviously, such procedures are relatively expensive and time-consuming in view of the additional materials, time, equipment, etc., required.

It is an object of this invention to provide a simple and economical means for the preparation of trialkyl lead salts of nitrophenols.

A more specific object of this invention is to provide a method for the preparation of inflammable compounds by the direct reaction between tetra-alkyl lead and nitrophenols.

This invention is based upon the discovery that tetraalkyl lead and nitrophenols will react directly with each other in the presence of silica gel as a catalyst under proper conditions to form alkyl lead salts of the nitrophenols.

Accordingly, contrary to the prior indirect methods, my invention is carried out by merely bringing the tetraalkyl lead and the nitrophenol together and reacting same in a suitable medium in the presence of silica gel as a catalyst.

For the purposes of this invention any member of the tetra alkyl lead group may be used, as, for example, tetramethyl lead, tetraethyl lead, tetrapropyl lead, etc. Furthermore, mixed tetraalkyl lead compounds may be used, such as trimethyl-ethyl lead. However, it is preferred to use tetra-ethyl lead, since it is so easy to prepare and also because it is easily obtained in large quantities in the open market.

The nitrophenols to be used in my process may contain one or more nitro groups. Therefore, the term "nitrophenols" as used herein is meant generically to cover phenols broadly containing one or more nitro groups.

While the reaction between the tetraalkyl lead and the nitrophenol will proceed at temperatures in general which are above ordinary room temperature (about 20° to 25° C.), it is preferable to maintain the temperature at about 70° C. in order to have the reaction proceed at a convenient rate which is neither too rapid nor too slow.

The following example is given in order to more clearly illustrate my invention. However, it is to be understood that nothing therein is to be construed in a limiting sense as there may be wide variations therefrom without departing from the spirit of the invention.

One part of picric acid is dissolved in a suitable volume of benzene and to the resultant solution is added rapidly about 1½ parts by weight of tetraethyl lead. The temperature is slowly raised to about 60° C. whence silica gel is added in very small portions. At about 70° C. the evolution of ethane becomes rapid and the addition of the silica gel (about ½₀ part having been added) is discontinued. The reaction mixture is then maintained at this temperature. At first the solvent assumes a deep red color which gradually becomes lighter as an orange-red solid precipitates from the reaction medium. When the evolution of ethane becomes quite slow, the heating is discontinued and, after cooling, the reaction mixture is filtered with suction. After washing with benzene and air-drying, there remains on the filter a red solid containing the silica gel. The red filtrate is reduced to a small volume with suction, whereupon a large quantity of red crystals appears. These crystals are obtained by filtering. The remainder of the filtrate, upon complete evaporation of the solvent, produces more of the inflammable substance in the form of a heavy, red oil. The crystalline product was found to contain lead and, when dropped on a warm plate, decomposed violently with an intense flame and a mild detonation.

I claim:

1. The method of preparing a tri-alkyl lead salt of nitrophenols by the direct reaction between tetraalkyl lead and a nitrophenol which comprises reacting the tetraalkyl lead with the nitrophenol in the presence of silica gel as a catalyst.

2. The method of preparing an inflammable substance by the direct reaction between tetraethyl lead and a nitrophenol which comprises reacting the tetraethyl lead with the nitrophenol in the presence of silica gel as a catalyst.

3. The method of preparing an inflammable substance by the direct reaction between tetraethyl lead and picric acid which comprises reacting the tetraethyl lead with the picric acid in the presence of silica gel as a catalyst.

4. The method of preparing an inflammable substance by the direct reaction between tetraalkyl lead and a nitrophenol which comprises reacting the tetraalkyl lead and nitrophenol in a suitable inert solvent liquid medium at a temperature of about 70° C. and in the presence of silica gel as a catalyst.

5. The method of preparing an inflammable substance by the direct reaction between tetraethyl lead and a nitrophenol which comprises reacting the tetraethyl lead and the nitrophenol in a suitable inert solvent liquid medium at a temperature of about 70° C. and in the presence of silica gel as a catalyst.

6. The method of preparing an inflammable substance by direct reaction between tetraalkyl lead and a nitrophenol which comprises reacting the tetraalkyl lead and the nitrophenol in the presence of silica gel as a catalyst while dispersed in an inert solvent liquid medium.

7. The method of preparing an inflammable substance by direct reaction between tetraethyl lead and picric acid which comprises reacting the tetraethyl lead and the picric acid in the presence of silica gel as a catalyst while dispersed in benzene.

8. The method of preparing an inflammable substance by the direct reaction between tetraalkyl lead and a nitrophenol which comprises dissolving the tetraalkyl lead and nitrophenol in benzene and gradually adding silica gel as a catalyst to said solution.

MARIO S. ALTAMURA.